United States Patent [19]
Woerner et al.

[11] Patent Number: 5,982,785
[45] Date of Patent: Nov. 9, 1999

[54] COMBINATION CONVENTIONAL TELEPHONY AND HIGH-BIT-RATE DIGITAL CHANNEL TRANSMISSION SYSTEM COMPRISING HIGH PASS FILTERS WHICH COMPRISE BOTH FIRST ORDER AND SECOND ORDER HIGH PASS FILTERS

[75] Inventors: Achim Woerner, Gruenwald; Dirk Schmuecking, Munich, both of Germany

[73] Assignee: Siemens Aktiengesellschaft, Munich, Germany

[21] Appl. No.: 08/754,037

[22] Filed: Dec. 3, 1996

[30] Foreign Application Priority Data

Apr. 23, 1996 [DE] Germany ............... 296 07 357 U

[51] Int. Cl.⁶ .................................................. H04J 1/02
[52] U.S. Cl. ..................... 370/488; 370/497; 370/480
[58] Field of Search ................................ 370/480, 485, 370/488, 489, 493, 497, 285, 295

[56] References Cited

U.S. PATENT DOCUMENTS 5,687,229  11/1997  Sih .......................................... 379/410
5,757,803   5/1998  Russell et al. ........................... 370/494
5,781,728   7/1998  Rybicki et al. ....................... 395/200.6

OTHER PUBLICATIONS

ITG–Fachtagung "Zukunft der Kommunikationsnetze", dated Dec. 14, 1995, pp. 87–96.

Ein Modell Für den VHDSL–Kanal, Schmücking et al, vol. 2/1996, ntz, pp. 20–27.

Primary Examiner—Douglas W. Olms
Assistant Examiner—David R Vincent
Attorney, Agent, or Firm—Hill & Simpson

[57] ABSTRACT

The symmetrical Cu double lead line is asymmetrically terminated by two digital signal high-pass filters, one thereof at the exchange side being formed with a high-pass filter of the 4th order and the other thereof at the subscriber side being formed with a high-pass filter of the 1st order having a limit frequency of about $0.1 \cdot f_{Baud}$ and a high-pass filter of the 2nd order. A high-pass of the 2nd or, respectively, 4th order has a limit frequency of about 100 kHz or with a limit frequency of about 30 kHz given employment of a separate 16 kHz band-stop filter.

20 Claims, 1 Drawing Sheet

COMBINATION CONVENTIONAL TELEPHONY AND HIGH-BIT-RATE DIGITAL CHANNEL TRANSMISSION SYSTEM COMPRISING HIGH PASS FILTERS WHICH COMPRISE BOTH FIRST ORDER AND SECOND ORDER HIGH PASS FILTERS

BACKGROUND OF THE INVENTION

Different transmission media such as Cu two-wire line (Cu double lead line), coaxial cable, optical fibers (or radio as well) can be provided in the user line area of a telecommunication network for the connection of the individual subscriber stations, whereby Cu double lead line play a dominant part in existing telecommunication networks. The trend toward higher transmission rates (beginning in the later 1980's with the introduction of the integrated services digital network (ISDN) with a transmission capacity of up to 160 kbit/s on a 6 km long Cu double lead line) potentially leads to optical fiber links being brought up to a subscriber-proximate switching point in the user line area, what is referred to as the cable brancher (fiber to curb). In the branching cable area, that is, for the rest of the link between cable brancher and subscriber station, however, the Cu double lead line installed thereat has usually remained. In 90% of all cases, the distance still to be bridged with Cu two-wire lines amounts to less than 500 m in Germany. The corresponding distance is about 2–3 times greater in the United States.

What are referred to as HDSL (high bitrate digital subscriber line) systems and ADSL (asymmetric digital subscriber line) systems have been tested for Cu double lead lines since 1994. Respectively 2 Mbit/s can be transmitted over approximately 3 km with HDSL systems comprising two double leads. Two through six Mbit/s can be transmitted in downstream direction from the exchange to the subscriber station with ADSL systems comprising only one Cu double lead line, whereas only a low-rate return channel is available in upstream direction from the subscriber station to the exchange, whereby an analog signal channel (0.3 through 3.4 kHz) for conventional telephony (POTS—plain old telephone service) is provided from the outset in both directions.

Hybrid optical fiber/Cu double lead network architectures and transmission systems for the transmission of bit rates on the order of magnitude of about 12 through 50 Mbit/s are currently being considered for Cu double lead lines in American and European standardization commissions under the names High Speed Copper Drop, Broadband Digital Subscriber Line (BDSL) or Very High Bit Rate Digital Subscriber Line (VDSL), whereby both symmetrical (identical bit rates in both transmission directions) as well as asymmetrical systems (high bit rate downstream to the subscriber; lower bit rate upstream in the return channel) are being considered (ITG Trade Convention, "Zukunft der Kommunikationsnetze", Cologne Dec. 14, 1995, pages 87–96; ntz (1996) 2, 20–27). Here, too, the boundary condition of conventional telephony (POTS) is of significance.

A conventional telephony channel (POTS channel) is currently provided in parallel to the digital signal channels on subscriber lines only in the ADSL systems. The determinant requirement of enabling conventional telephony in parallel that determines the selection of the transmission system or, respectively, of the line code led to the fact in ADSL systems that only carrier systems (single carrier or multi-carrier systems) wherein the spectra of the carrier-modulated digital signal lie far above the conventional telephony channel were taken into consideration, so that a high-pass filtering has no influence thereon. The POTS channel is connected in and out at the subscriber and at the exchange side with frequency separating filters (splitters) having digital signal high-pass filters. The high-pass in the frequency separating filters at both ends of the channel can be a Butterworth high-pass of the 4th order with a limit frequency of 100 kHz in order to already achieve a blocking attenuation value of 60 dB at the charge tone (16 kHz) of the conventional telephone service.

Digital signal baseband systems, by contrast, are less suitable in the framework of ADSL systems because the signal-to-noise ratio at the receiver input is too greatly deteriorated due to the high-pass filtering at the subscriber side and exchange side, and the smoothing becomes too involved. Given, for example, a 2 Mbit/s signal with 4-PAM line code and Nyquist filtering, the frequency spectrum would thus be concentrated on the lower 500 kHz. A high-pass filtering with a high-pass of the 4th order having a limit frequency of 100 kHz at both ends of the channel would make this baseband transmission extremely involved in view of the smoothing and would lead to too great a deterioration of the signal-to-noise ratio at the receiver input since the especially beneficial lower frequency range of the channel (with low line attenuation and crosstalk interference) is precisely what cannot be utilized.

The same also applies to VDSL baseband systems. Here, too, the high-pass filtering with a high-pass of the 4th order having a limit frequency of 100 kHz at both ends of the channel would require an extremely high outlay for distortion correction increasing with the length of the channel pulse response and the height of the pulse trailer adjoining the principle pulse since the low high-pass limit frequency of 100 kHz for VDSL systems (with, for example, a baud rate of 12.5 Mbaud) leads to an extremely long channel pulse response and the high filter order required leads to large pulse trailers.

SUMMARY OF THE INVENTION

It is an object of the present invention to provide a transmission system for high bit rate digital signals and conventional telephony signals on symmetrical Cu double lead lines that avoids such disadvantages.

The invention is directed to a transmission system with digital signal channels having a high bit rate and with a conventional telephony channel on symmetrical Cu double lead lines provided with a frequency separating filter at both sides, particularly in the user line area of telephone networks. This transmission system is inventively characterized in that the symmetrical Cu double lead line is asymmetrically provided at both sides with digital signal high-pass filters, one of which, preferably the high-pass filter of the exchange side, if formed with a high-pass of the 4th order and whereof the other, preferably the high-pass filter of the subscriber side, is formed with a high-pass of the 1st order having a limit frequency of about $0.1 \cdot f_{Baud}$ (or even only about $0.05 \cdot f_{Baud}$) and with a high-pass of the second order. In a further development of the present invention, a high-pass of the 2nd or, respectively, 4th order with a limit frequency of about 100 kHz or, respectively, given employment of a separate 16 kHz band-stop filter, of about 30 kHz is provided.

Due to the asymmetrical high-pass filtering, the present invention makes both a VDSL (very high bitrate digital subscriber line) baseband transmission system for bit rates on the order of magnitude of about 12 through 50 Mbit/s for asymmetrical or symmetrical service as well as a conventional telephone channel parallel thereto advantageously available in the branching cable area with line lengths of about 100 through 500 m on a Cu double lead line.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

DESCRIPTION OF THE PREFERRED EMBODIMENTS

Figure 1:
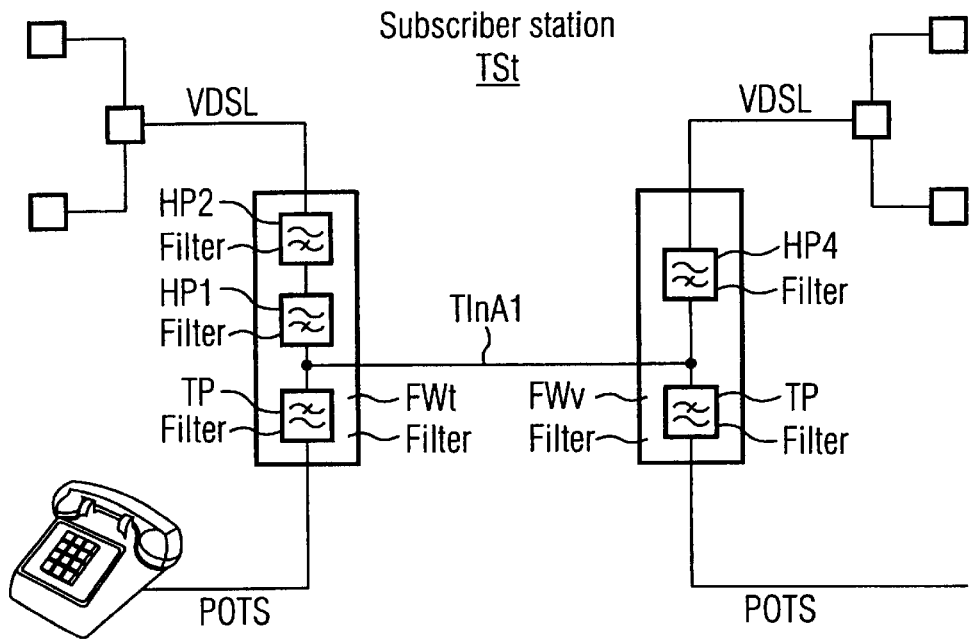
FIG. 1 depicts the structure of a transmission system of the present invention with high-pass filters built into the frequency separating filters at both sides.

FIG. 1 outlines the structure of a transmission system with a Cu double lead line TlnA1 (symmetrical Cu two-lead line) leading to a subscriber station TsT and terminated at both sides with a frequency separating filter FWt, FWv. These frequency separating filters first each respectively contain a low-pass filter TP in the form, for example, of a Butterworth low-pass of the 2nd order via which a conventional telephony channel POTS proceeds. The frequency separating filters FWt, FWv each respectively contain a high-pass filter via which a high bitrate digital signal channel VDSL is assumed to proceed. The Cu two-wire line TlnA1 is then thereby asymmetrically provided with such high-pass filters:

First, a high-pass filter HP1 of the 1st order having a limit frequency $f_g=0.1 \cdot f_{Baud}$ that is provided at one side, at the subscriber side in the exemplary embodiment. It is thereby assumed that the integration of such a high-pass filter of the 1st order is optimum for a high bitrate baseband transmission with respect to the equalizer outlay and the obtainable signal-to-noise ration as well. Given a baud rate of, for example, 12.5 Mbaud, the limit frequency $f_g$ of this optimum high-pass filter HP1 thus lies at about 1.25 MHz.

However, the utilization of such an optimum high-pass filter is not adequate for fully assuring a parallel POTS operation because of the blocking attenuation of 60 dB required at 16 kHz (charge tone). A high-pass filter HP2 of the 2nd order having a limit frequency $f_g$ of about 100 kHz is therefore also provided in addition to the optimum high-pass filter HP1.

At the other side, that is, in the frequency separating filter FWv of the exchange side, by contrast, a high-pass filter HP4 of the 4th order and having a limit frequency $f_g$ of about 100 kHz is provided, so that too much digital signal power is not cut off.

Given such an asymmetrical high-pass filtering, the influence of the individual, optimum high-pass with the high limit frequency and the thus reduced length of the channel pulse response dominates overall in the channel. Given asymmetrical high-pass filtering, this channel pulse response approaches the pulse response given high-pass filtering only with the optimum high-pass filter and is clearly better than given symmetrical high-pass filtering with two symmetrical high-pass filters of the fourth order with a limit frequency $f_g \approx 100$ kHz.

Insofar as a separate band-stop filter is provided for the 16 kHz charge tone, the limit frequency of the high pass filters of the 2nd and 4th can also be reduced to 30 kHz in order to nonetheless achieve a blocking attenuation of 60 dB at the upper end of the voice band at 3.4 kHz.

In high bitrate baseband transmission systems with parallel analog telephony channel, the asymmetrical high-pass filtering leads to the best possible signal-to-noise ratio at the output of the receiver. An optimum high-pass HP1 with a lower limit frequency (lying, for example, at 600 kHz) can also be provided given strong crosstalk interference that increases with the frequency. The noise part is thereby in fact boosted because of the imperfect equalization (due to longer pulse response given constant filter length of the equalizer). At the same time, however, the influence of the dominating crosstalk interference is reduced in that more signal energy is transmitted in the lower frequency range of the channel with lower line attenuation and higher crosstalk attenuation.

Figure 2:
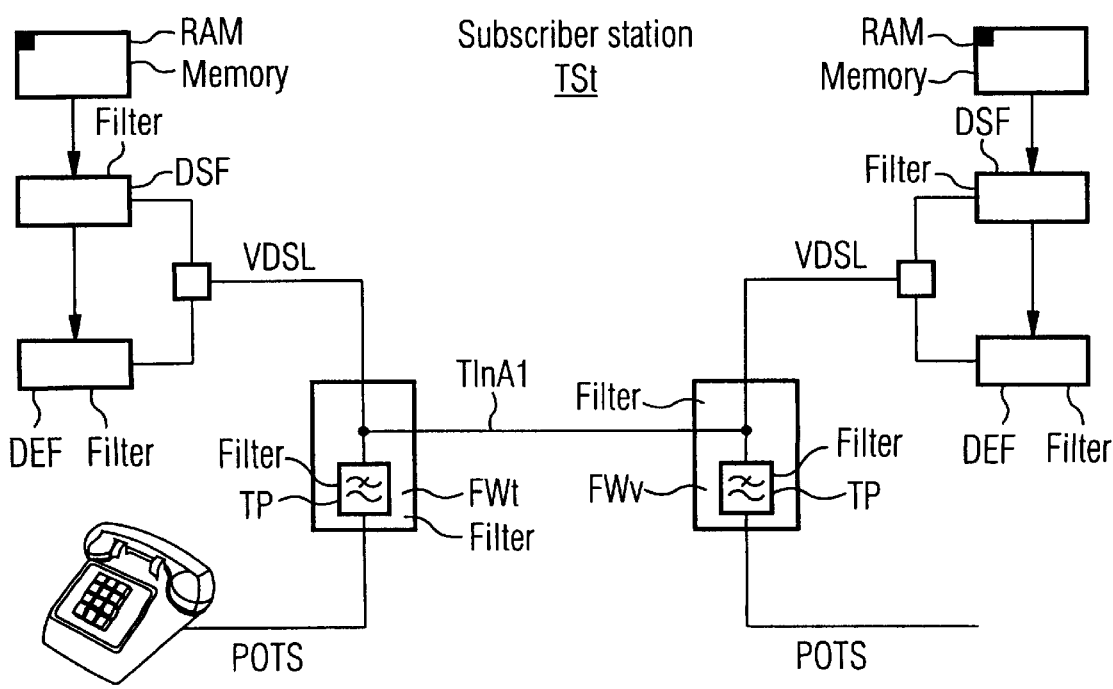
FIG. 2 depicts the structure of a transmission system of the present invention with high-pass filters integrated into the digital transmission and reception filters.

Alternatively to the integration of two different analog high-pass filters HP1, HP2 and HP4 (in FIG. 1) into the frequency separating filters FWt, FWv (in FIG. 1) terminating at both sides the Cu two-wire line TlnA1, it is also possible to integrate the high-pass filters into the digital transmission and reception filters of the VDSL system. A structure of the resulting transmission system is depicted in FIG. 2. According to FIG. 2, a symmetrical Cu two-wire line TlnA1 leading to a subscriber station Tst is again terminated with a frequency separating filter FWt, FWv at both sides. However, the frequency separating filters now only respectively contain the low-pass filter TP over which the conventional telephony channel POTS proceeds, but not the respective high-pass filter for the high bitrate digital signal channel VDSL. On the contrary, these high-pass filters are integrated into digital transmission and reception filters DSF or, respectively, DEF of the VDSL system that are already present. The filter coefficients of the digital transmission and reception filters are thereby stored in a random access memory RAM. Such a digital realization also has the advantage that transmission and reception filter coefficients can also be stored for a mode without conventional telephony. Insofar as the conventional telephone is not required on occasion during operation of the VDSL system, these coefficients can be used and a somewhat better signal-to-noise ratio or a higher data rate as well can thus be achieved.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. A transmission system with digital signal channels having a high bit rate and with a conventional telephony channel on symmetrical copper (Cu) double lead lines provided with a frequency separating filter at both sides thereof, comprising:

a symmetrical Cu double lead line that is asymmetrically provided with first and second digital signal high-pass filters respectfully at both ends thereof; and the first filter being a high-pass of the 4th order and the second filter being formed by a high-pass of the 1st order and a high-pass of the 2nd order.

2. The transmission system according to claim 1, wherein the first high-pass filter formed with the high-pass of the 4th order is located at an exchange side of the lead line and the second high-pass filter formed with the high-pass of the 1st order and the high-pass of the 2nd order is located at a subscriber side of the lead line.

3. The transmission system according to claim 1, wherein the high-pass filter of the 1st order has a limit frequency of substantially $0.1 \cdot f_{Baud}$.

4. The transmission system according to claim 1, wherein the high-pass filter of the 1st order has a limit frequency of substantially $0.05 \cdot f_{Baud}$.

5. The transmission system according to claim 1, wherein the high-pass filter of the 2nd or, respectively, 4th order has a limit frequency of substantially 100 kHz.

6. The transmission system according to claim 1, wherein, given employment of a separate 16 kHz stop-band filter, the high-pass filter of the 2nd or, respectively, 4th order has a limit frequency of substantially 30 kHz.

7. The transmission system according to claim 1, wherein a respective high-pass filter of the first or, respectively, second filter is contained in a respective frequency separating filter that respectively terminates the Cu double lead line.

8. The transmission system according to claim 1, wherein the high-pass filters of the first or, respectively, second filter are respectively integrated into digital transmission and reception filters of a VDSL system.

9. A transmission system with digital signal channels having a high bit rate and with a conventional telephony channel on symmetrical copper (Cu) double lead lines provided with a frequency separating filter at both sides thereof, comprising:

a symmetrical Cu double lead line that is asymmetrically provided with first and second digital signal high-pass filters respectfully at both ends thereof, the first filter being a high-pass of the 4th order and the second filter being formed by a high-pass of the 1st order and a high-pass of the 2nd order; and the first high-pass filter formed with the high-pass of the 4th order located at an exchange side of the lead line and the second high-pass filter formed with the high-pass of the 1st order and the high-pass of the 2nd order located at a subscriber side of the lead line.

10. The transmission system according to claim 9, wherein the high-pass filter of the 1st order has a limit frequency of substantially $0.1 \cdot f_{Baud}$.

11. The transmission system according to claim 9, wherein the high-pass filter of the 1 st order has a limit frequency of substantially $0.05 \cdot f_{Baud}$.

12. The transmission system according to claim 9, wherein the high-pass filter of the 2nd or, respectively, 4th order has a limit frequency of substantially 100 kHz.

13. The transmission system according to claim 9, wherein, given employment of a separate 16 kHz stop-band filter, the high-pass filter of the 2nd or, respectively, 4th order has a limit frequency of substantially 30 kHz.

14. The transmission system according to claim 9, wherein a respective high-pass filter of the first and second filters is contained in a respective frequency separating filter that respectively terminates the Cu double lead line.

15. The transmission system according to claim 9, wherein the high-pass filters of the first and second filters are respectively integrated into digital transmission and reception filters of a VDSL system.

16. A transmission system with digital signal channels having a high bit rate and with a conventional telephony channel on symmetrical copper (Cu) double lead lines provided with a frequency separating filter at both sides thereof, comprising:

a symmetrical Cu double lead line that is asymmetrically provided with first and second digital signal high-pass filters respectfully at both ends thereof, the first filter being a high-pass of the 4th order and the second filter being formed by a high-pass of the 1st order and a high-pass of the 2nd order;

the first high-pass filter formed with the high-pass of the 4th order located at an exchange side of the lead line and the second high-pass filter formed with the high-pass of the 1st order and the high-pass of the 2nd order located at a subscriber side of the lead line; and first and second frequency separating filters that contain a respective high-pass filter of the first and second filters, respectively, the frequency separating filters terminating the Cu double lead line.

17. The transmission system according to claim 16, wherein the high-pass filter of the 1 order has a limit frequency of substantially $0.1 \cdot f_{Baud}$.

18. The transmission system according to claim 16, wherein the high-pass filter of the 1st order has a limit frequency of substantially $0.05 \cdot f_{Baud}$.

19. The transmission system according to claim 16, wherein the high-pass filter of the 2nd or, respectively, 4th order has a limit frequency of substantially 100 kHz.

20. The transmission system according to claim 16, wherein, given employment of a separate 16 kHz stop-band filter, the high-pass filter of the 2nd or, respectively, 4th order has a limit frequency of substantially 30 kHz.

* * * * *